(12) United States Patent
Ishii et al.

(10) Patent No.: US 7,006,033 B2
(45) Date of Patent: Feb. 28, 2006

(54) PULSE RADAR APPARATUS

(75) Inventors: Satoshi Ishii, Kawasaki (JP);
Yoshikazu Dooi, Kawasaki (JP);
Hiroyuki Yatsuka, Kawasaki (JP);
Tetsuo Seki, Kawasaki (JP); Kazuaki Hamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/680,250

(22) Filed: Oct. 8, 2003

(65) Prior Publication Data

US 2004/0070532 A1   Apr. 15, 2004

(30) Foreign Application Priority Data

Oct. 9, 2002  (JP) .............................. 2002-296776
May 15, 2003 (JP) .............................. 2003-138012

(51) Int. Cl.
   *G01S 13/26*   (2006.01)
(52) U.S. Cl. ...................... 342/127; 342/128; 342/130; 342/70; 342/194
(58) Field of Classification Search .................. 342/70, 342/89, 94, 95, 118, 127–136, 194, 195, 201–204
See application file for complete search history.

(56) References Cited

U.S. PATENT DOCUMENTS

| 5,512,834 A * | 4/1996 | McEwan ..................... 324/642 |
| 5,731,781 A * | 3/1998 | Reed .......................... 342/135 |
| 6,122,040 A * | 9/2000 | Arita et al. ................. 356/4.01 |
| 6,426,716 B1 * | 7/2002 | McEwan ...................... 342/28 |
| 6,590,522 B1 * | 7/2003 | Okamura ..................... 342/134 |
| 2003/0025631 A1 * | 2/2003 | Kim ........................... 342/198 |
| 2003/0078730 A1 * | 4/2003 | Sekiguchi .................... 701/301 |
| 2003/0088361 A1 * | 5/2003 | Sekiguchi .................... 701/301 |
| 2003/0097237 A1 * | 5/2003 | Sekiguchi .................... 702/158 |
| 2004/0054473 A1 * | 3/2004 | Shimomura ................. 701/301 |
| 2004/0080449 A1 * | 4/2004 | Horibe ........................ 342/70 |

FOREIGN PATENT DOCUMENTS

| JP | 2000241535 | 9/2000 |
| JP | 2001116822 | 4/2001 |

OTHER PUBLICATIONS

"Practical considerations in pulse-echo radar for short range sensing", McClanahan, D.L.; Zuercher, J.C.; Misra, D.; Instrumentation and Measurement, IEEE Transactions on, vol.: 47, Issue: Oct. 5, 1998 Ps: 1078-1084.*

* cited by examiner

*Primary Examiner*—John B. Sotomayor
(74) *Attorney, Agent, or Firm*—Staas & Halsey LLP

(57) ABSTRACT

An embodiment comprises a unit generating a control pulse signal by delaying a basic signal in generating a transmission pulse, and a unit performing a gate operation on a received signal using the control pulse signal. Another embodiment comprises a unit generating a control pulse signal by delaying a signal generated using a first basic signal, a second signal for phase modulation having a lower frequency than the first signal, and a pseudo-random signal generated at an intermediate frequency between the frequencies of the first and second signals, and a unit performing the gate operation.

12 Claims, 26 Drawing Sheets

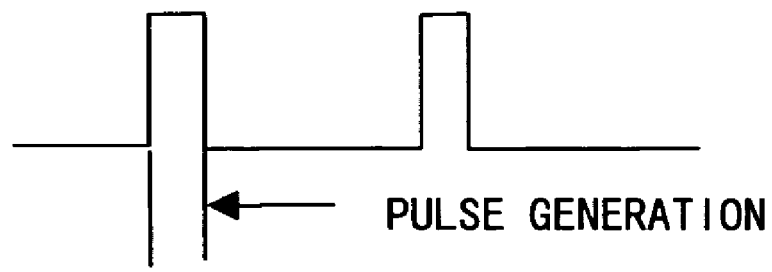
F I G. 6 A
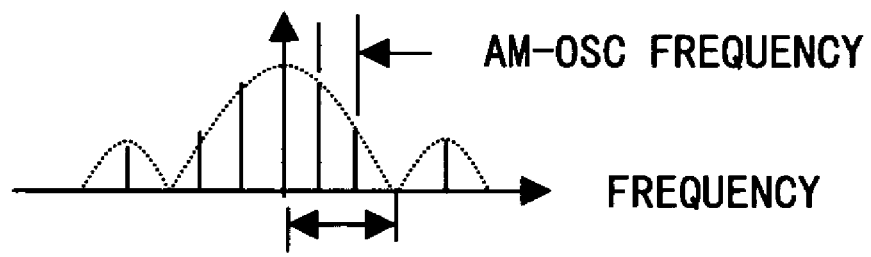
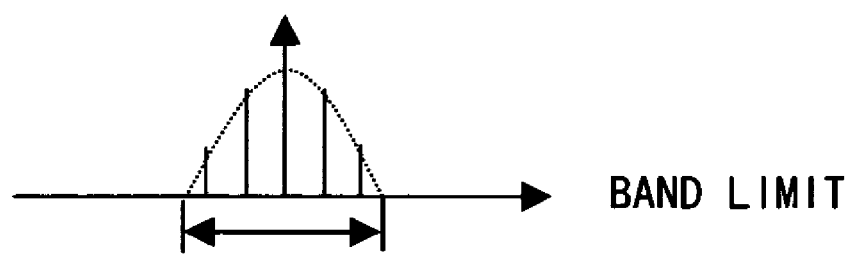
F I G. 6 B

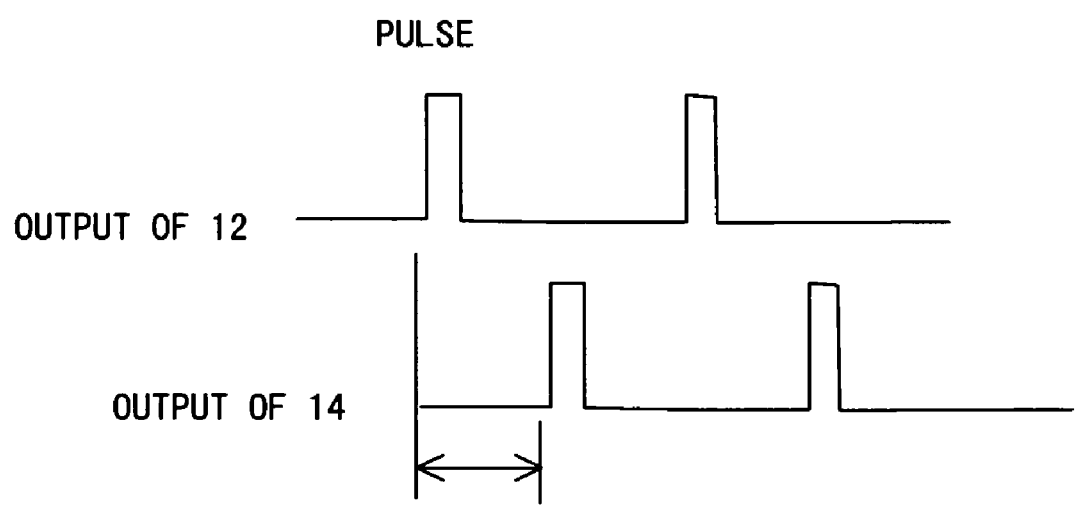
F I G. 8

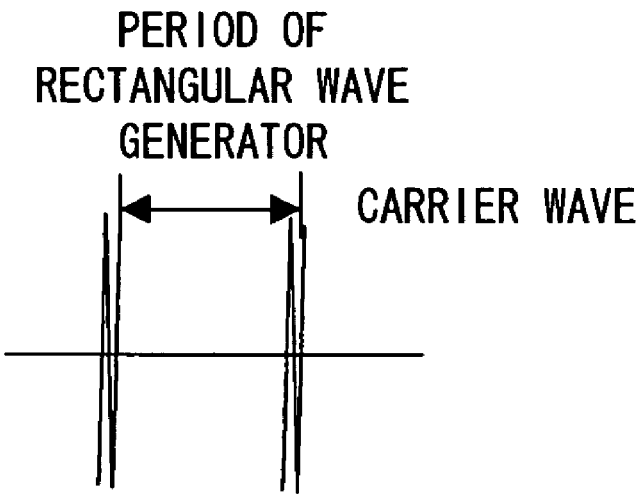
F I G. 1 0 A
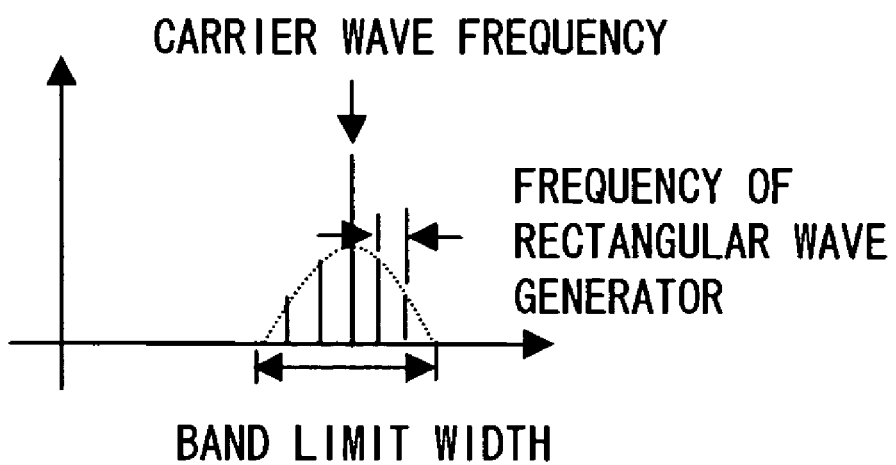
F I G. 1 0 B

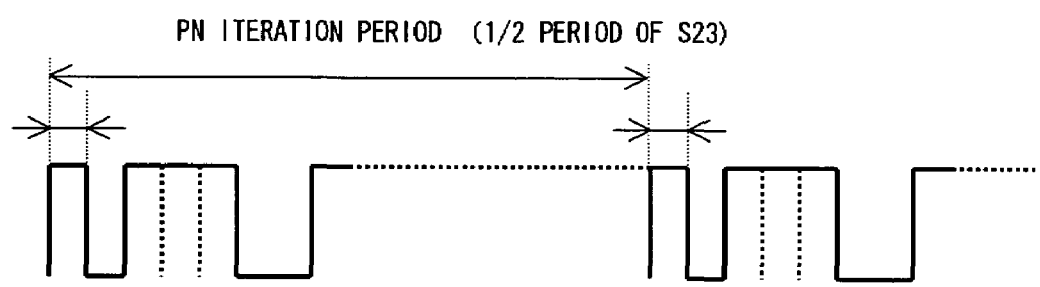
F I G. 18

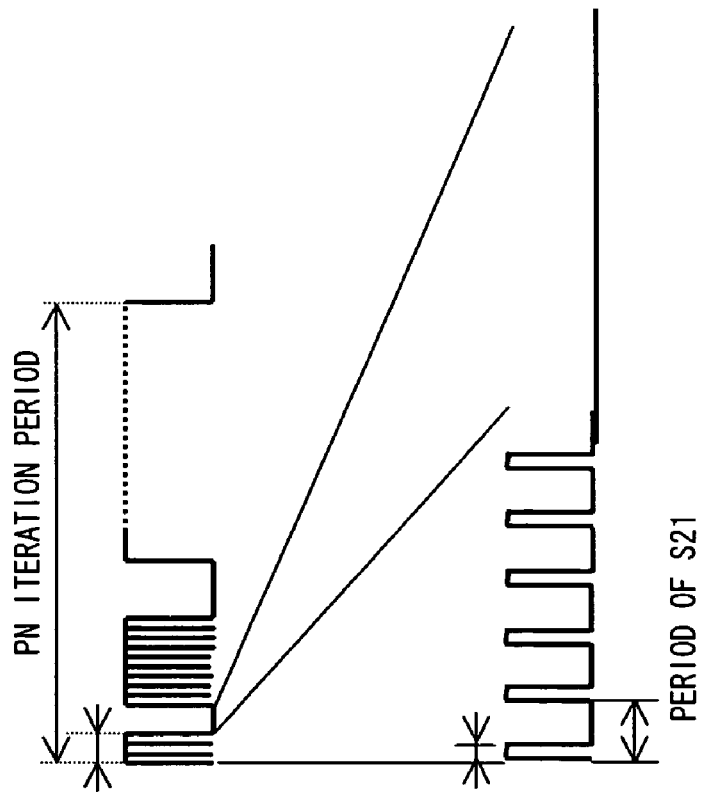
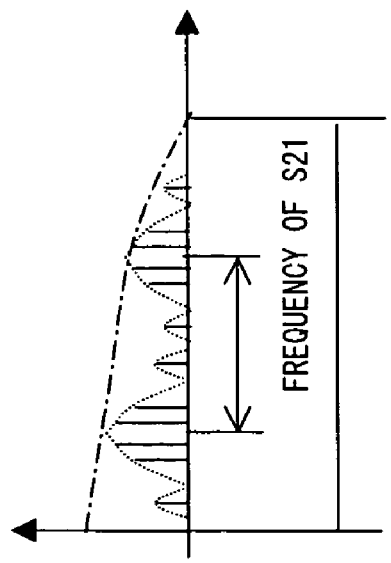
FIG. 20A
FIG. 20B

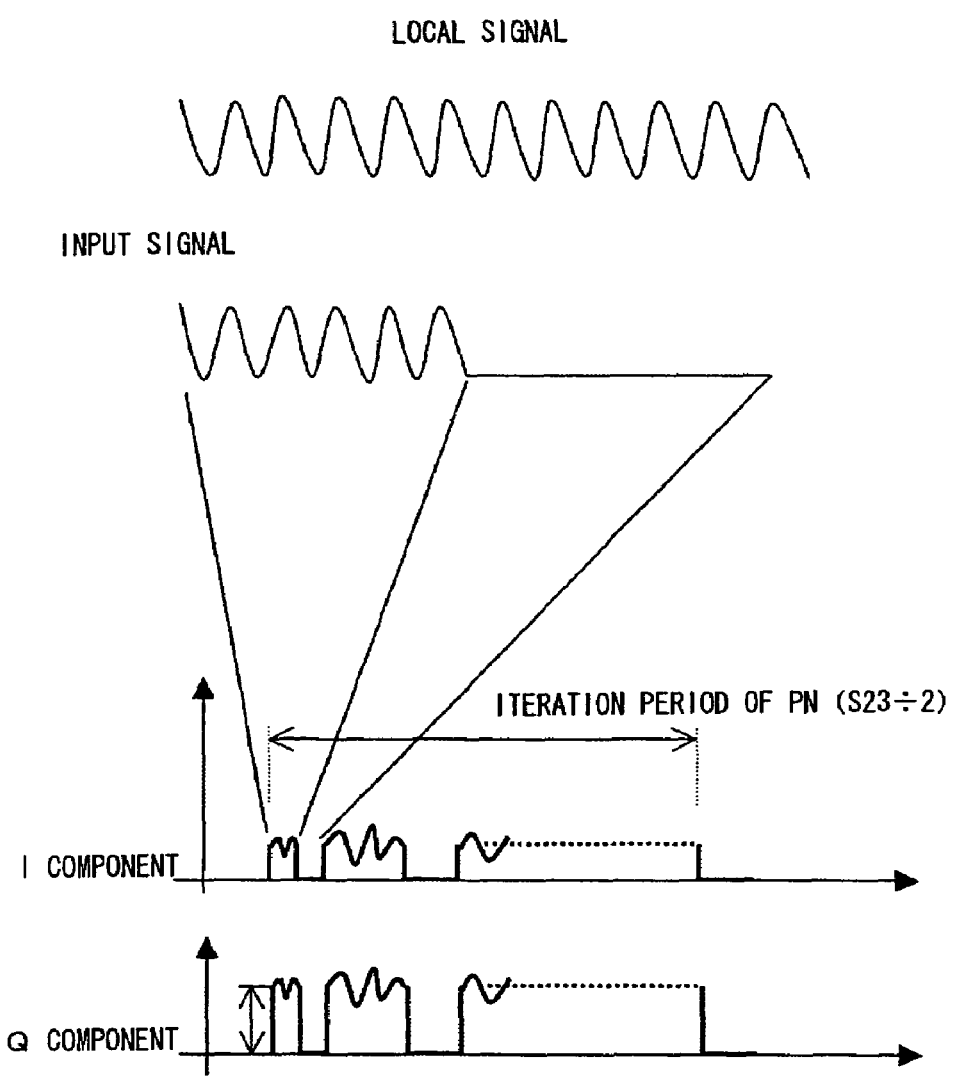
F I G. 2 6

PULSE RADAR APPARATUS

BACKGROUND OF THE INVENTION

1. Field of the Invention

The present invention relates to a radar system of emitting an electric wave and receiving a reflected wave, thereby detecting a target, and more specifically to a high-resolution pulse radar apparatus which is a pulse radar for emitting a high-frequency transmission electric wave normally after sectioning the electric wave at equal intervals in a pulse form, and is used for short-distance measurement.

2. Description of the Related Art

Most of the current radar units are pulse radar units. A pulse radar generally detects a target in the distance, and measures the distance to the target. Various signal processing technologies for use by such pulse radar units are described in the literature "Radar Signal Processing Technology" by Matsuo Sekine of Institute of Electronics, Information and Communication Engineers.

The conventional technology for detecting a target at a relatively short distance is disclosed by the literature "A Method of Measuring Distance and Velocity of Short-distance Mobile Object", '00 B-2-2, p. 215, by Morigami and Nakatsukasa at Convention of Institute of Electronics, Information and Communication Engineers. In this literature, a method of measuring the distance and the velocity of a mobile object located within the distance of 125 m using a microwave of 9.5 GHz amplitude-modulated by a sine wave signal.

The Japanese Patent Application Laid-open No. 2001-116822 discloses a small, low-cost, and low power consumption microwave band pulse transmission/reception apparatus applied for use in data communications, sensors, measures, etc. using a weak microwave band radio. A gate is used in this application, but it is to suppress oscillation, and has a purpose different from that of the present invention.

The Japanese Patent Application Laid-open No. 2000-241535 discloses a high-resolution short-distance radar which can be used by a simple license application, can be used outdoors without electric wave interference, and is expected to be widely used in a noncontact distance measurement.

As described above, the conventional pulse radar has been used in measuring a relatively long distance such as several tens of meters to a target. To use a pulse radar in measuring a short distance, it is necessary to obtain a sharp pulse, a wide frequency band, and also a wide band for an element of the device, but it is difficult to satisfy these conditions.

FIGS. 1 and 2 are explanatory views of available bands of the pulse radar. FIG. 1 is an explanatory view of an available band for common AM and FM signals. The available band of AM and FM signals are limited to a narrow band around the frequency of a carrier wave, thereby reducing the influence of noise.

FIG. 2 is an explanatory view of a band of a pulse radar. The narrower the pulse width of a pulse radar, the broader the available band. Therefore, using normal signal power S, the noise power N of the entire band becomes large, the S/N (signal to noise ratio) is lowered, and the system is subject to the influence of noise. The S/N ratio is specifically deteriorated at above 1 GHz, and various undesired problems occur. If the pulse radar width is extended to reduce the S/N ratio, then the band becomes narrower and the noise N is reduced, but the shortest distance to a target to be detected becomes longer.

To set the short-distance limit to approximately 15 cm in detecting a target in the conventional technology of a pulse radar as described above, it is necessary to set the pulse width of about 1 nsec. To attain this, a band width of about 1 GHz is required, and the band width of noise becomes considerably broad, that is, about 1 GHz, thereby lowering the S/N ratio and making the detection of a target more difficult.

Furthermore, since a signal with a pulse width of about 1 nsec, and a frequency band width of about 1 GHz is used, a general-purpose digital LSI such as a DSP, etc. cannot be used, and a circuit has to be configured by a semiconductor exclusively developed for a high-speed use, the system is costly and the properties fluctuate, thereby making it difficult to realize mass production.

Another problem with the conventional technology is that the interference by a plurality of radar units can detect other targets than a target to be detected. That is, a malfunction of detecting wrong targets occurs.

SUMMARY OF THE INVENTION

The present invention aims at solving the above-mentioned problems, and providing a pulse radar apparatus with a short-range detection limit and a high distance resolution without using an exclusively developed semiconductor, and providing a pulse radar apparatus capable of preventing a malfunction of detecting wrong targets by applying the spread spectrum technology to a pulse radar.

An embodiment of the present invention can include: a detection unit for detecting, for example, phase-detecting (I-Q detection), an output of a gate unit; and a distance computation unit for computing a distance to a target as associated with a delay amount which shows the maximum value of a component, for example, the square sum of an I component and a Q component, corresponding to the amplitude of a received signal using an output of the detection unit when a carrier wave generator changes the delay amount. Otherwise, the embodiment can include a detection unit and a distance computation unit for computing a distance to a target as associated with a phase difference between a basic signal in generating a transmission pulse and a received signal using an output of the detection unit, for example, the I component and the Q component.

The embodiment can further include a modulation signal generation unit for generating a pulse from a basic signal in generating a transmission pulse, for example, a pulse actually having a transmission pulse width, generating a modulation signal for generation of a transmission pulse with a band limit of the spectrum range of the pulse, and providing the generated signal for an amplitude modulator for amplitude-modulating a sine wave as a carrier wave.

The pulse radar apparatus according to the present invention includes a control pulse generation unit for generating a control pulse signal by delaying a signal generated using a first signal which is a basic signal in generating a transmission pulse, a second signal for phase modulation of a frequency lower than the first signal, and a pseudo-random signal for modulation generated at an intermediate frequency between the first and second signals, and a gate unit for functioning as a gate for a received signal.

In the embodiment of the present invention, the pseudo-random signal for modulation can be an amplitude modulation signal for the first signal. Otherwise, the pseudo-random signal for modulation can be a phase modulation signal for the first signal and the above-mentioned generated signal can be a signal in which a pulse exists in a section in which a pseudo-random signal is low.

The embodiment of the present invention can further include: a detection unit for detecting an output of the gate unit; a distance computation unit for computing a distance to a target as associated with a delay amount which shows the maximum value of a component corresponding to the amplitude of a received signal, or a phase difference between the basic signal and a received signal using an output of the detection unit.

The embodiment of the present invention can further include a modulation signal generation unit for generating a pulse from a signal generated using the first signal, the second signal, and the pseudo-random signal, and generating a modulation signal for generation of a transmission pulse with a band limit of the spectrum range of the pulse.

As described above, according to the present invention, for example, a basic signal in generating a transmission pulse is delayed, and a gate operation can be performed on a received signal using the delayed signal.

BRIEF DESCRIPTION OF THE DRAWINGS

FIG. 6A shows a waveform of a time area of an output of a pulse generation circuit and a band limiter;

FIG. 6B shows a waveform of a frequency area of an output of a pulse generation circuit and a band limiter;

FIG. 8 shows an output of a pulse generation circuit provided with an output of the programmable delay line;

FIG. 10A shows a waveform of a time area of an output of an amplitude modulator;

FIG. 10B shows a waveform of a frequency area of an output of an amplitude modulator;

FIG. 18 shows an example of a PN sequence;

FIG. 20A shows a waveform of a time area of an output of an AND gate and a pulse generation circuit and a band limiter;

FIG. 20B shows a waveform of a frequency area of an output of an AND gate and a pulse generation circuit and a band limiter;

FIG. 26 shows an output of the I-Q detector according to the second embodiment of the present invention.

DESCRIPTION OF THE PREFERRED EMBODIMENTS

Figure 1:
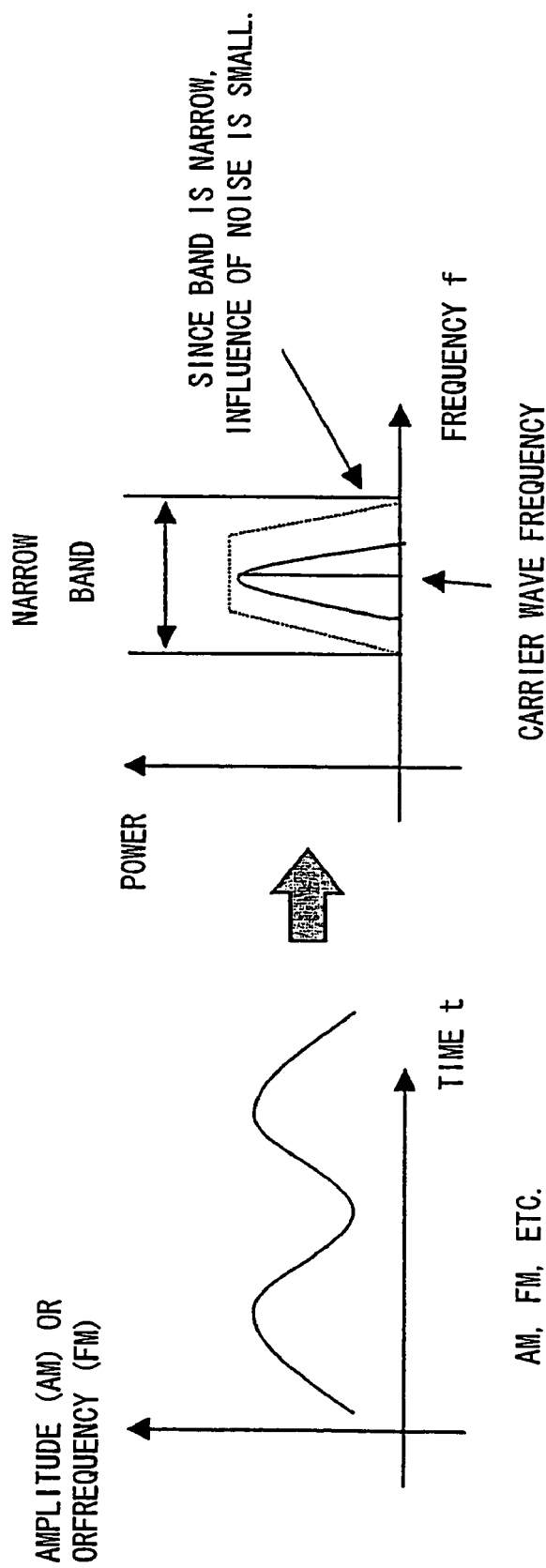
FIG. 1 is a view (1) of the influence of noise according to the conventional technology.
Figure 2:
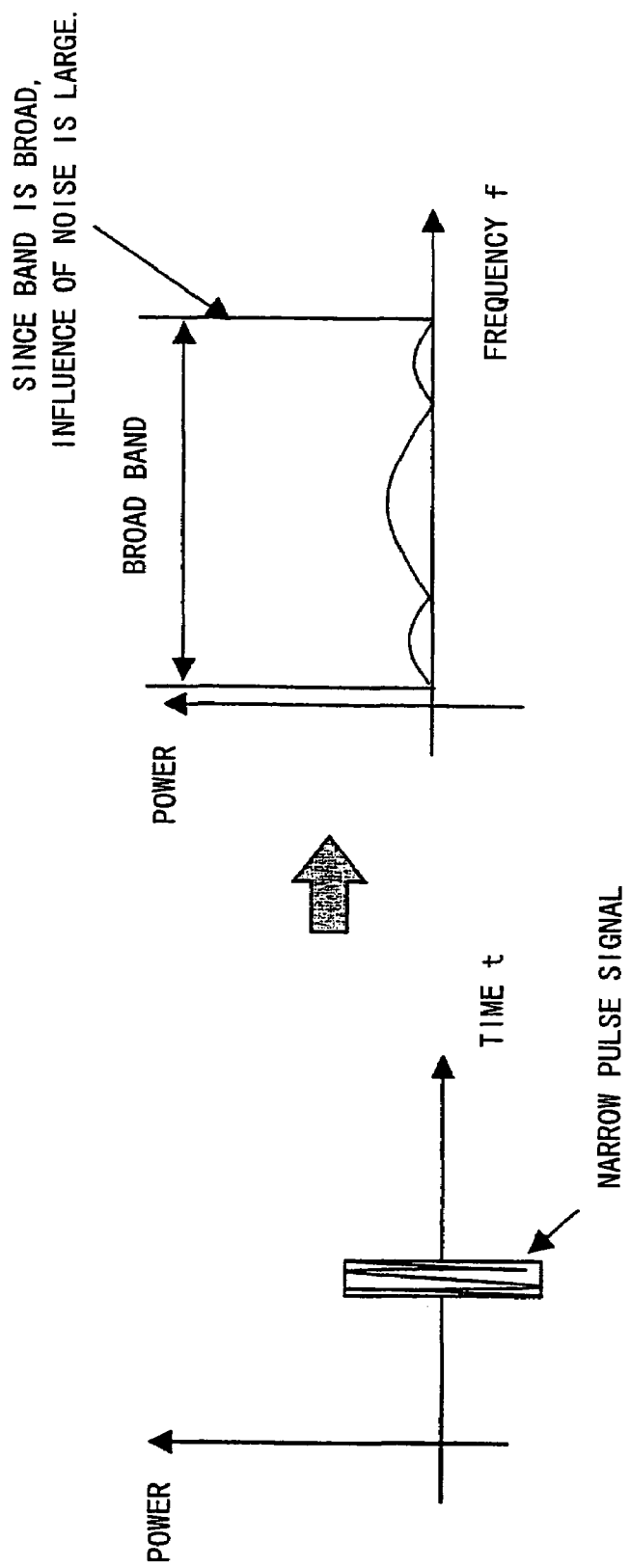
FIG. 2 is a view (2) of the influence of noise according to the conventional technology.
Figure 3:
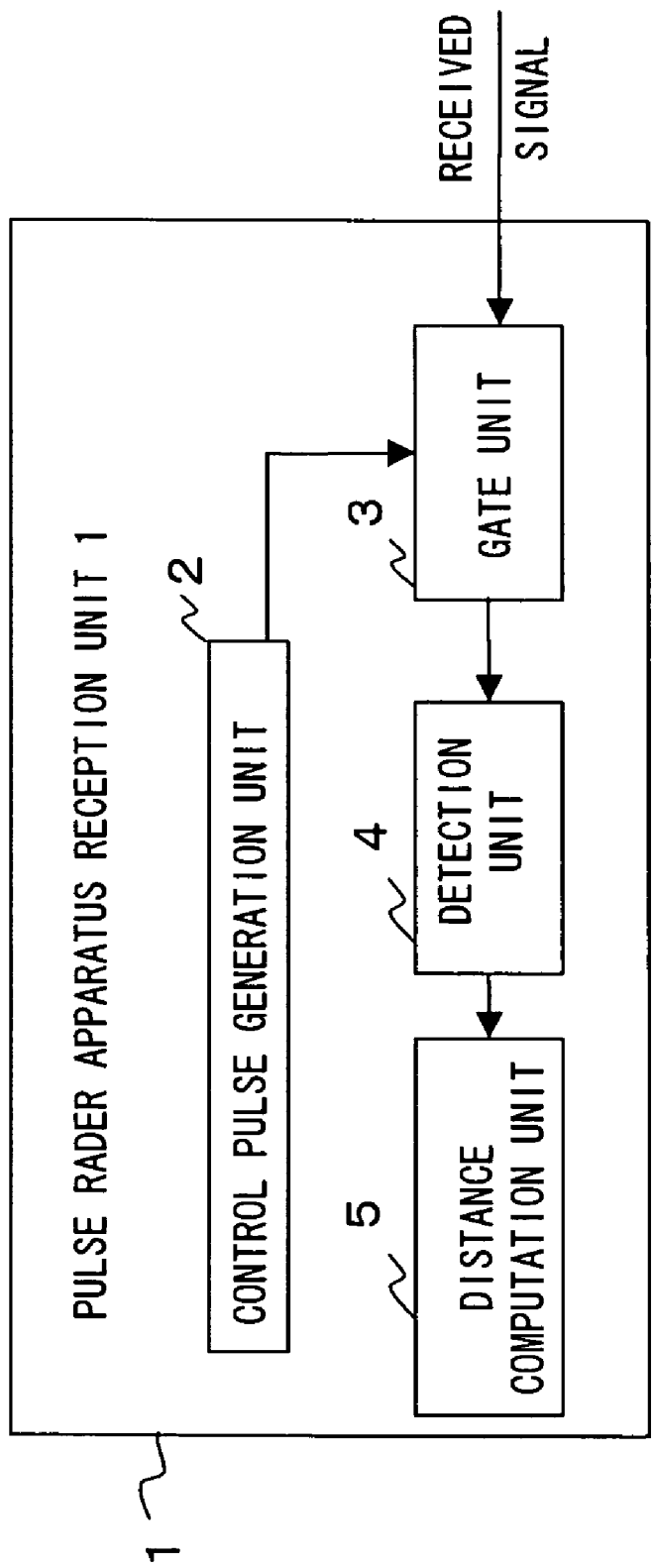
FIG. 3 is a block diagram of the configuration showing the principle of the reception unit of the radar apparatus according to the present invention.

FIG. 3 is a block diagram of the configuration of the reception unit of the pulse radar apparatus according to the present invention. FIG. 3 shows the configuration in principle of a pulse radar apparatus 1 for detecting a target by transmitting a pulse signal, and the apparatus 1 comprises at least a control pulse generation unit 2 and a gate unit 3.

The control pulse generation unit 2 generates a control pulse signal by delaying a basic signal in generating a transmission pulse, for example, an AM rectangular wave signal, and the gate unit 3 performs a gate operation on a received signal reflected by a target using a control pulse signal.

Figure 4:
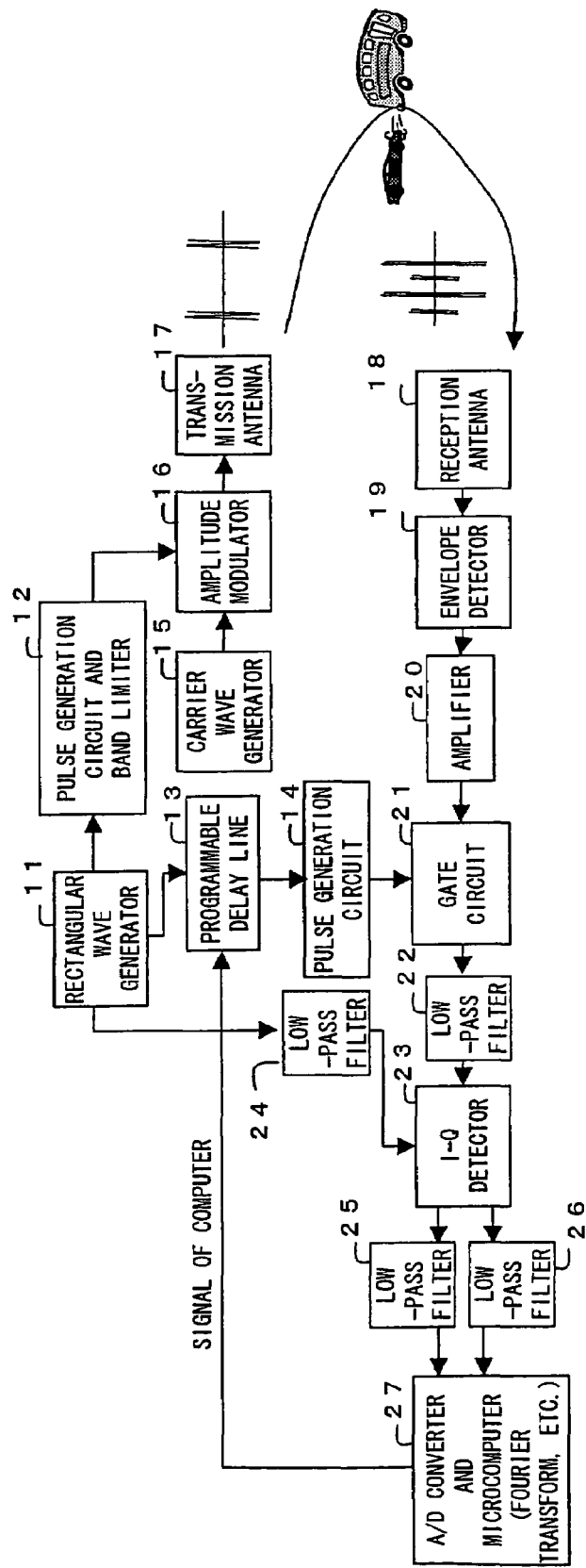
FIG. 4 is a block diagram of the configuration of the ASK pulse radar apparatus according to a first embodiment of the present invention.

FIG. 4 is a block diagram of the configuration according to the first embodiment of the pulse radar apparatus of the present invention. In the embodiment of the present invention, a pulse radar based on the ASK (amplitude shift keying) system of amplitude-modulating a sine wave signal as a carrier wave is described.

Figure 5:
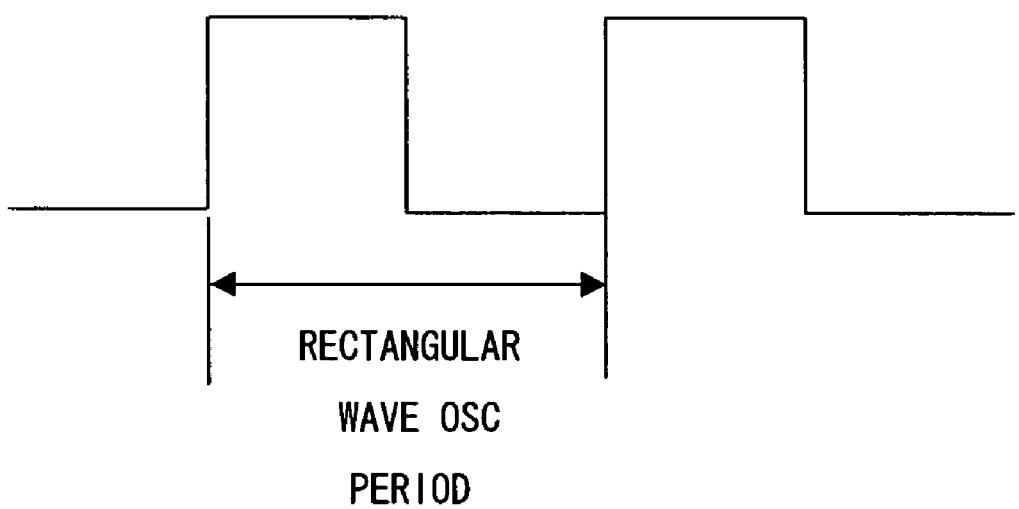
FIG. 5 shows an output of a rectangular wave generator according to the first embodiment of the present invention.

The operation of the pulse radar apparatus 1 shown in FIG. 4 is described below by referring to a waveform, etc. of each of the units shown in FIGS. 5 through 16. First, a rectangular wave generator 11 shown in FIG. 4 generates a rectangular wave as shown in FIG. 5. For example, the duty ratio of the rectangular wave is assumed to be 50% and the frequency of the wave is assumed to be 10 MHz.

A pulse generation circuit and a band limiter 12 generate in synchronization with, for example, a rise of a rectangular wave generated by the rectangular wave generator 11 a pulse having the same frequency and a smaller duty ratio, that is, a narrow pulse as shown in FIG. 6A, and simultaneously limits the band in accordance with legal rules as shown in FIG. 6B.

The pulse width shown in FIG. 6A is basically determined by the distance resolution requested by a pulse radar. Assuming that the requested resolution (shortest distance) is a and the pulse width is pW, the turnaround distance of an electric wave is 2×a. Assuming that the velocity of light is c, the pulse width pW is represented by the following equation.

$$pW = 2 \times a / c \qquad (1)$$

For example, if a=0.3 m, then pW is 2 ns.

For example, a band around 76 GHz is used for a domestic car radar. In accordance with legal rules, a band of 76 through 77 GHz can occupy 500 MHz per channel. When a pulse width is 2 ns, the width of a main lobe is 400 MHz, but a side lobe is equal to or higher than that, and is to be attenuated. Therefore, it is necessary to limit the band.

Figure 7:
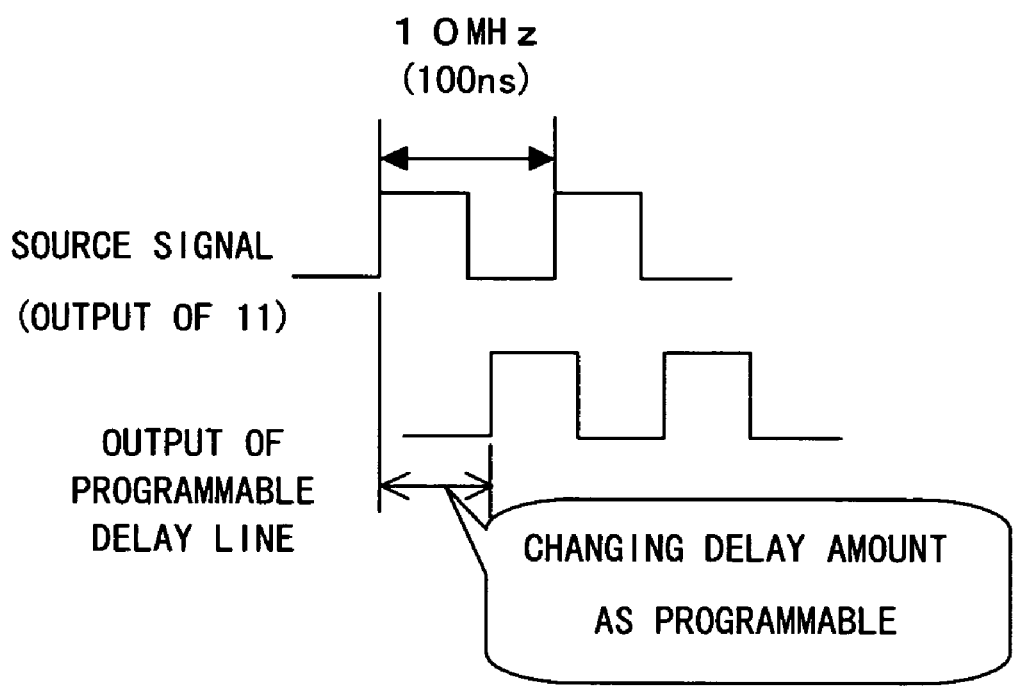
FIG. 7 shows an output of a programmable delay line.

A programmable delay line 13 shown in FIG. 4 delays as shown in FIG. 7 a rectangular wave generated by the rectangular wave generator 11 corresponding to a signal from a computer, for example, a signal which can be shifted every 1 ns in the range of 0 to 100 ns. The delay range and the shift amount depend on a request. The direction of a delay shift also depends on a request. For example, when the arrangements in the system is not known, it is necessary to sweep the delay time. If a car whose location has been detected is tracked, the vicinity of a delay time corresponding to the distance is to be searched, thereby controlling the delay amount depending on the contents of a request.

A pulse generation circuit 14 generates a pulse having the same frequency as the rectangular wave delayed by the programmable delay line 13, having 10 MHz and the duty ratio of 50%, but a smaller duty ratio, and a matching rise. The pulse is delayed by the delay time by the programmable delay line 13 relative to the output of the pulse generation circuit and the band limiter 12 as shown in FIG. 8.

Figure 9A:
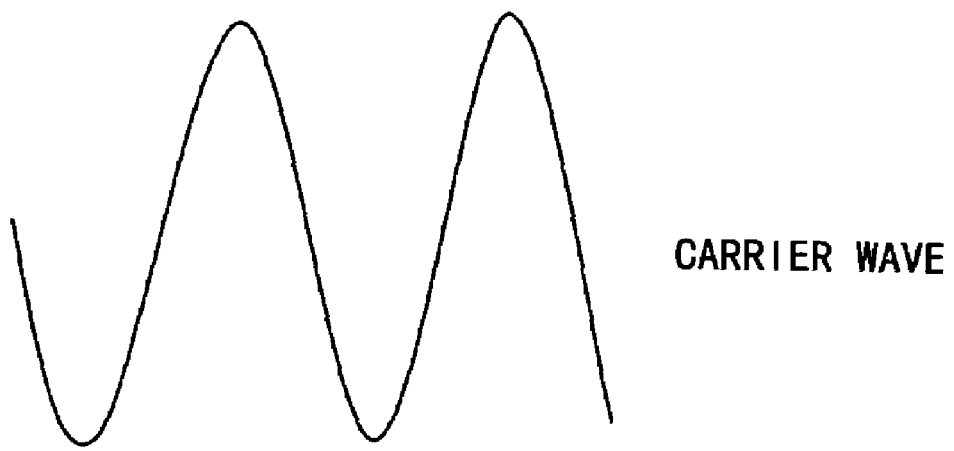
FIG. 9A shows a waveform of a time area of an output of a carrier wave generator.
Figure 9B:
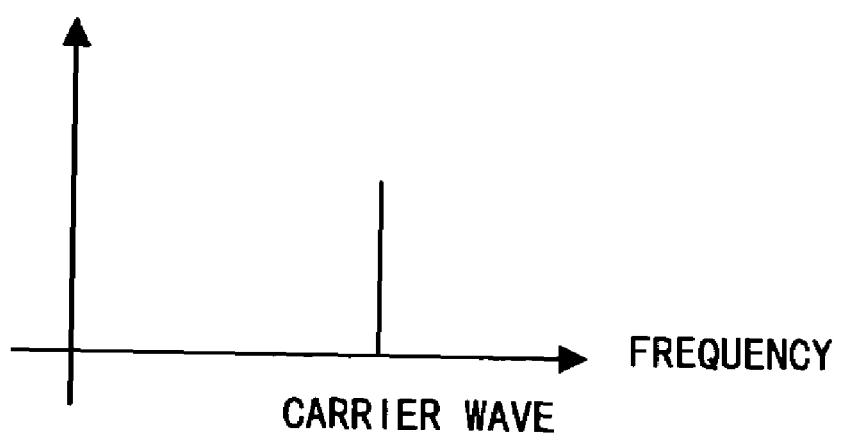
FIG. 9B shows a waveform of a frequency area of an output of a carrier wave generator.
Figure 11:
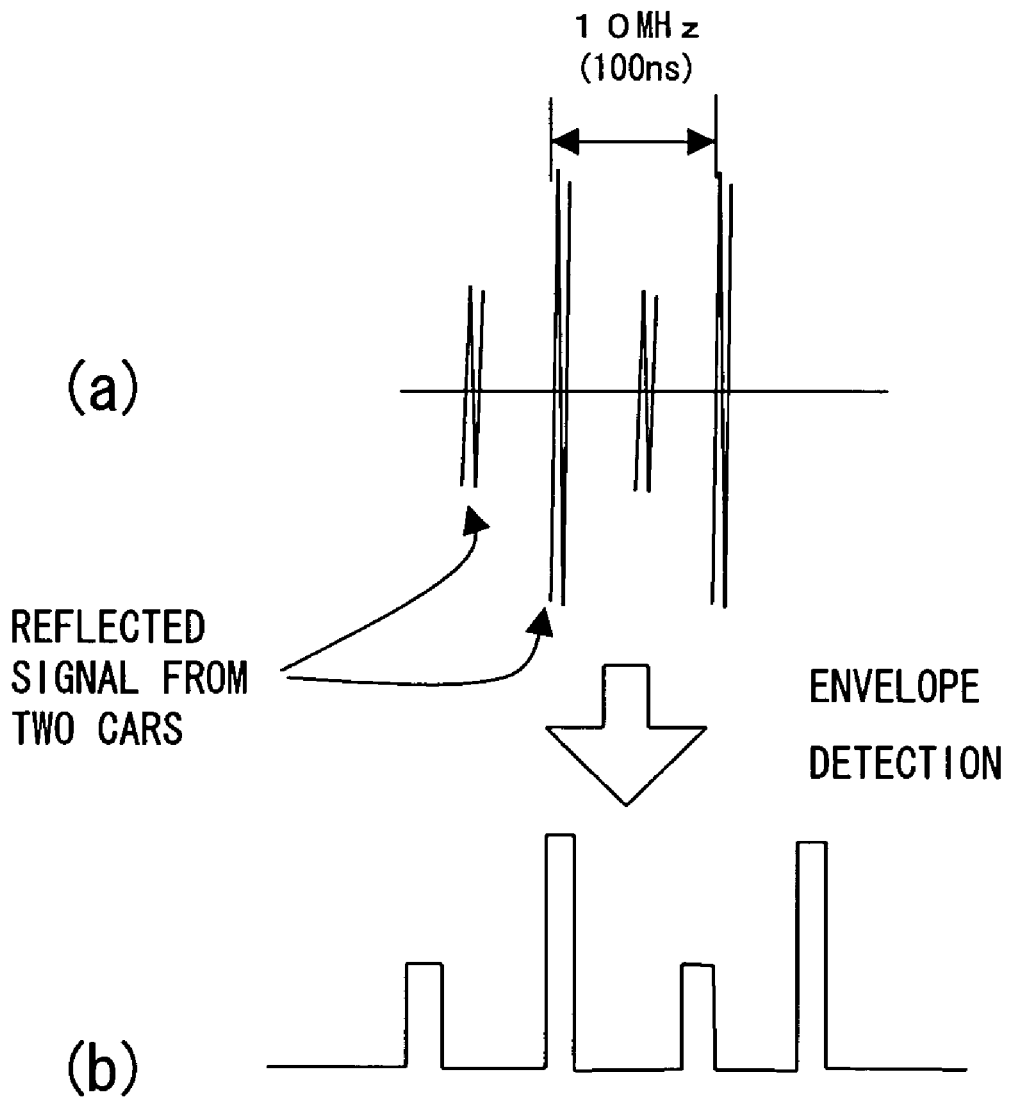
FIG. 11 shows an output of an envelope detector.

FIGS. 9A and 9B show the output of a carrier wave generator 15. The carrier wave is a continuous wave (sine wave) as shown in FIG. 9A, and its frequency has a single element as shown in FIG. 9B.

The output of the carrier wave generator 15 is amplitude-modulated by a amplitude modulator 16 using a pulse output by the pulse generation circuit and the band limiter 12. The output is shown in FIGS. 10A and 10B.

FIG. 10A shows an output of the amplitude modulator 16, and shows a carrier wave shown in FIG. 9A output during the HIGH period of the pulse having the waveform as shown in FIG. 6A. FIG. 10B shows the frequency area waveform of the output, and it has a band width limited with the frequency of the carrier wave set at the center.

The output of the amplitude modulator 16 is transmitted by a transmission antenna 17 to a target to be detected by a radar. In this example, it is reflected by each of the two cars and received by a reception antenna 18 of the pulse radar apparatus.

FIG. 11(a) shows input waveforms to the reception antenna 18. Among them, a waveform having small amplitude indicates a reflected wave from a small car in front, and a waveform having large amplitude indicates a reflected wave from a large car behind.

The reception pulse received by the reception antenna 18 is envelope-detected by a detector 19. FIG. 11(b) shows the output waveform of the detector 19. As shown in FIG. 11(b), the reflected waves from the two cars and received by the reception antenna 18 are output as two sets of pulses having different amplitude as shown below after being envelope-detected. The intervals of the output pulses are drawn at longer intervals than the signals received by the reception antenna 18.

The output of the detector 19 is amplified by an amplifier 20, and then provided for a gate circuit 21. The output of the pulse generation circuit 14, that is, the pulse delayed by the programmable delay line 13 as explained by referring to FIG. 8, is input to the gate circuit 21, and the gate circuit 21 performs a gate operation on the output of the amplifier 20 using the output of the pulse generation circuit 14 as a control signal.

In this gate operation, a portion other than a target reception pulse is trimmed even if the width of a transmission pulse is narrow, and the influence of noise is high, thereby correctly detecting the target.

Figure 12:
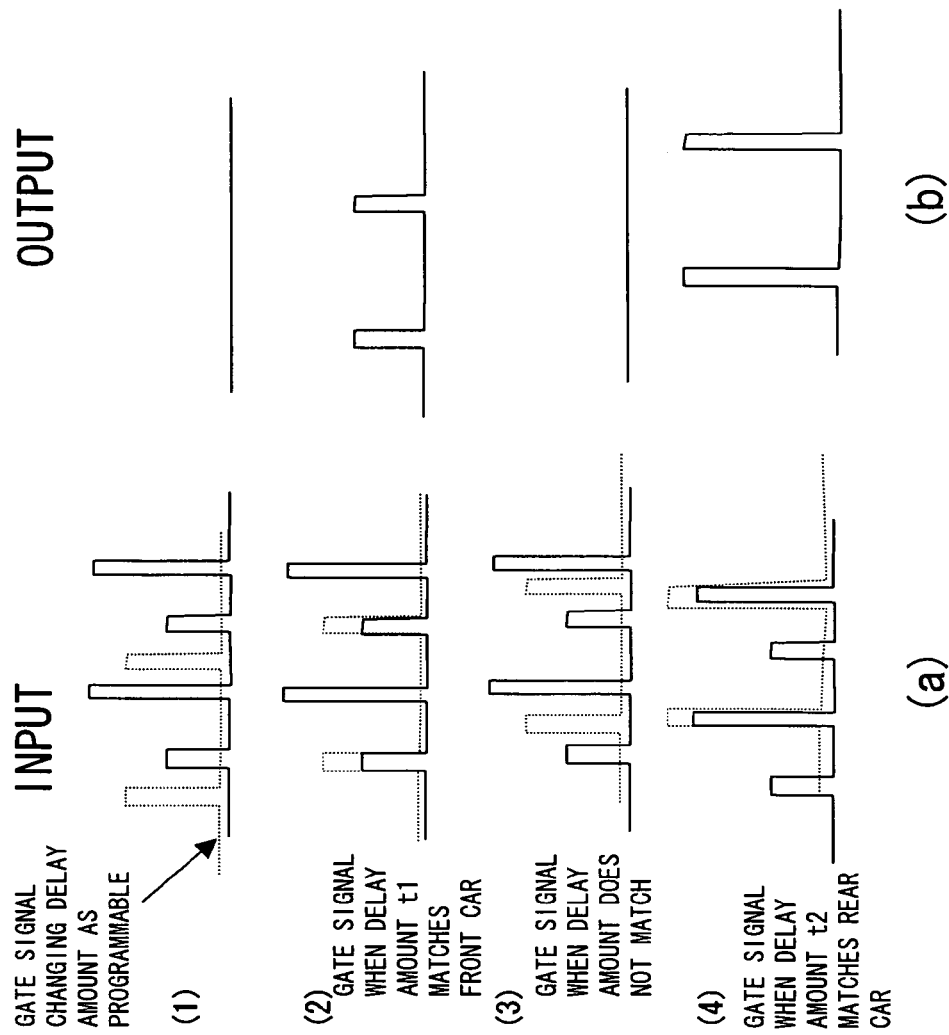
FIG. 12 shows an operation of a gate circuit.

FIG. 12 shows the operation of the gate circuit 21. FIG. 12(a) shows the waveform drawn in solid lines and indicating the output of the amplifier 20 as an input to the gate circuit 21, and the waveform drawn in the dotted lines and indicating the output of the pulse generation circuit 14 as a gate signal for control. FIG. 12(b) shows an output of the gate circuit 21.

In (1), the delay amount of the gate signal is small, and the gate pulse does not match in time any of the input pulses, and the output of the gate circuit 21 is basically 0. In (2), the pulse of the gate signal matches at time t1 the pulse corresponding to the waveform reflected by the front car (in front) shown in FIG. 4, and the pulse is obtained as an output. In (3), the delay amount is intermediate, and the output is 0 as in (1). In (4), the delay amount t2 matches the time of the pulse reflected by the farther car (rear car), and the pulse is output.

Figure 13:
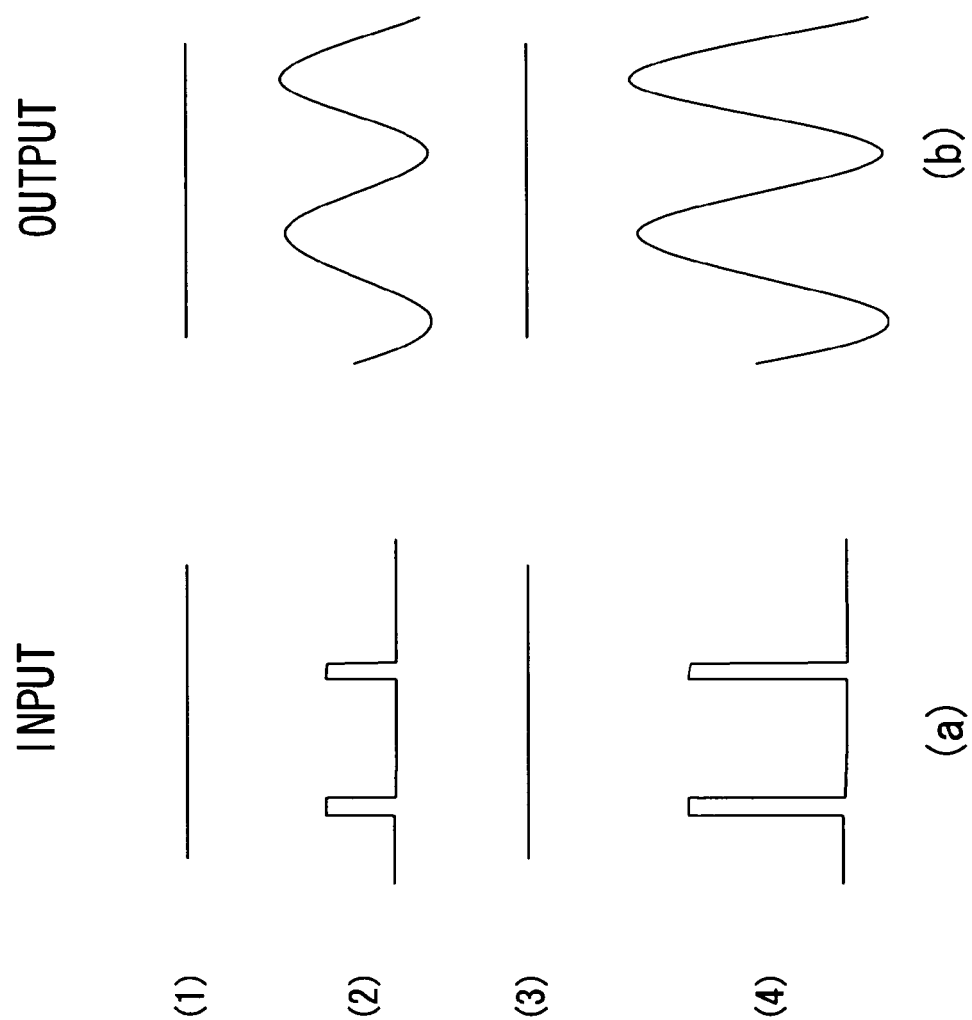
FIG. 13 shows an output of a low-pass filter into which an output of a gate circuit is input.

FIG. 13 is an explanatory view of the input and output to and from a low-pass filter 22. The filter passes the frequency component of 10 MHz or lower as a fundamental wave of the output of the rectangular wave generator 11, the output corresponding to (1) and (3) is basically 0, and the output corresponding to (2) and (4) is a sine wave, but the amplitude and the phase of the sine wave correspond to the size and the position of the input pulse.

The output of the low-pass filter 22 is supplied to an I-Q detector 23. The output of the rectangular wave generator 11 is also input to the I-Q detector 23 through a low-pass filter 24. As described above, the two low-pass filters 22 and 24 pass the fundamental wave as the output of the rectangular wave generator 11, that is wave of 10 MHz, and the I-Q detector 23 performs I-Q detection on the output of the low-pass filter 22 using the output of the low-pass filter 24, that is, the sine wave as a fundamental of the output of the rectangular wave generator 11, as a reference, and outputs an I (synchronizing) component and a Q (orthogonal) component.

Figure 14:
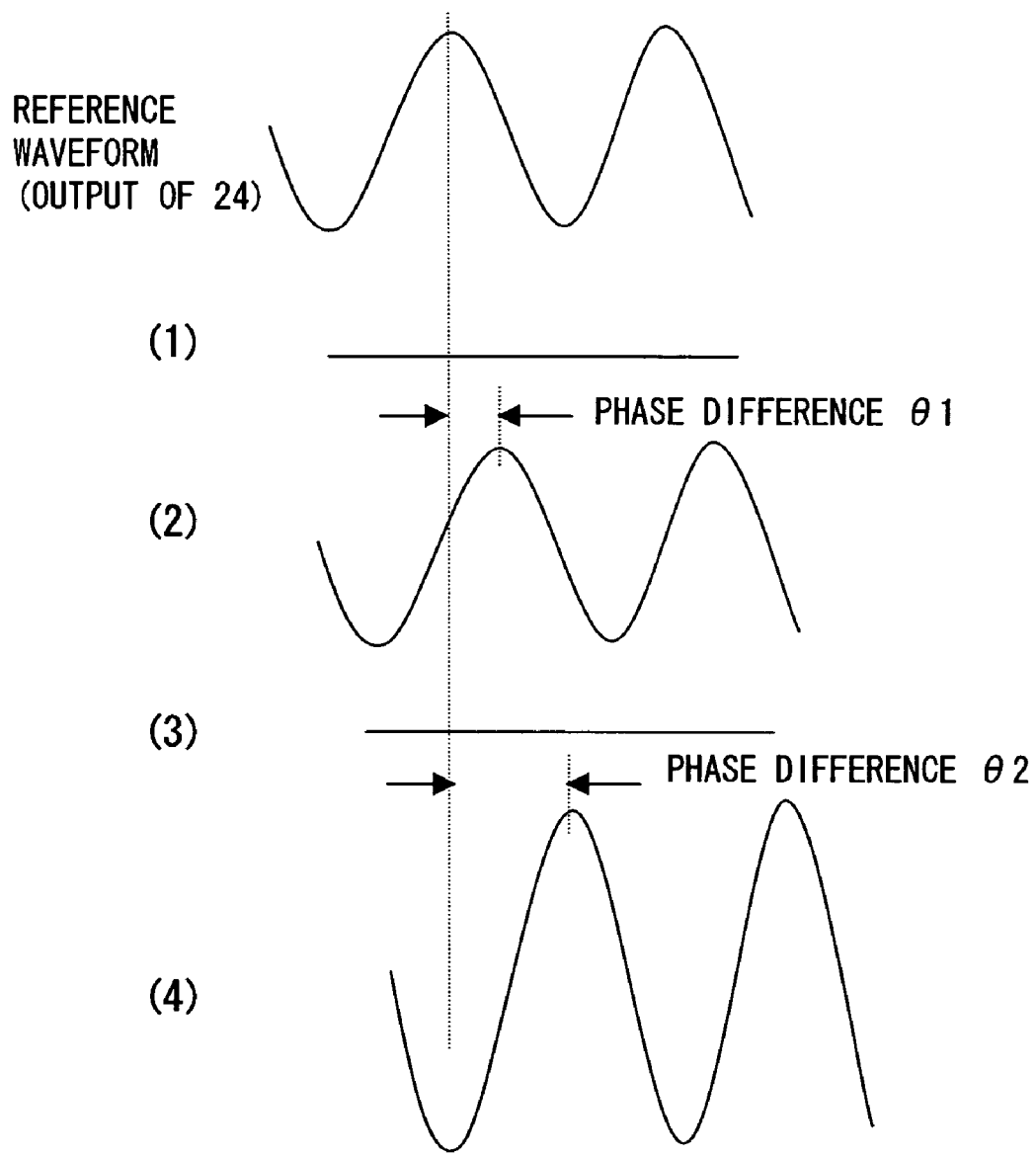
FIG. 14 shows an output of an I-Q detector.

FIG. 14 shows an operation of the I-Q detector 23. In FIG. 14, the uppermost waveform indicates the output of the low-pass filter 24, that is, a reference waveform. (1) corresponds to (1) shown in FIG. 13. Since the output of the low-pass filter 22 is 0, the outputs of I and Q is also 0. (2) is the output corresponding to the reflected wave from the front car, and the phase difference θ1 from the reference signal of the I and Q signals corresponds to the distance to the front car, and the amplitude corresponds to the reception intensity of the reflected wave.

(3) corresponds to the case in which the intermediate delay amount is applied, and the output of I and Q is 0. (4) corresponds to the reflected wave from the rear car. The phase difference θ2 from the reference signal of the output of I and Q corresponds to the distance to the rear car, and the amplitude corresponds to the reception intensity of the reflected wave, thereby indicating a larger value than in (2).

In the present embodiment, the distance to the target is obtained using the I and Q components as the output of the I-Q detector using two types of methods. The computation of a distance is performed by the A/D converter and a microcomputer (MC) 27 using the I and Q components as the output of the I-Q detector 23 through two low-pass filters 25 and 26. The low-pass filters 25 and 26 correspond to half the sampling frequency inserted before the A/D converter.

In the first method of obtaining the distance to a target, a value of ($I^2+Q^2$) corresponding to the amplitude is obtained from the I and Q components as the output of the low-pass filters 25 and 26. The point at which the value of ($I^2+Q^2$) shows the maximum value while changing the delay time by the programmable delay line 13 shown in FIG. 4 is defined as the time required for an electric wave to be reflected by the target and return. Based on the obtained time, the distance to the target is computed. The first method is used when, for example, a pulse width is small, and the signal power is also small.

Figure 15:
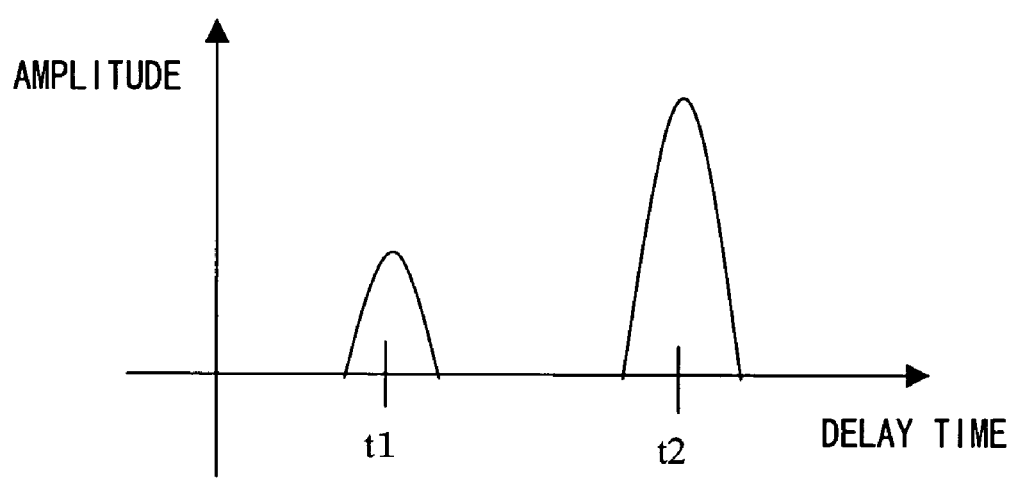
FIG. 15 shows the relationship between the amplitude corresponding to the output of the I-Q detector and the delay time of the delay line.

FIG. 15 shows the relationship between the delay time and the amplitude. In FIG. 15, the amplitude indicates the maximum values at the time t1 corresponding to the turn-around of the electric wave to the front car explained by referring to FIG. 4, and at the time t2 of turnaround by the electric wave to the larger car.

In the second method of obtaining the distance to the target, the distance to the target is computed using the phase differences obtained from the I and Q components, that is, the phase differences θ1 and θ2 explained by referring to FIG. 14. The second method is used when, for example, the signal power is relatively large.

The phase difference θ, the delay time τ, and the distance D to the target are obtained by the following equations using the I and Q components, the same iteration period T (100 ns) of the transmission pulse as the output of the rectangular wave generator 11, and the velocity c of the light.

$$\theta=\tan^{-1}(Q/I) \quad (2)$$

$$\tau=\theta T/2\pi \quad (3)$$

$$D=\tau\times c/2=\theta T c/4\pi \quad (4)$$

Figure 16:
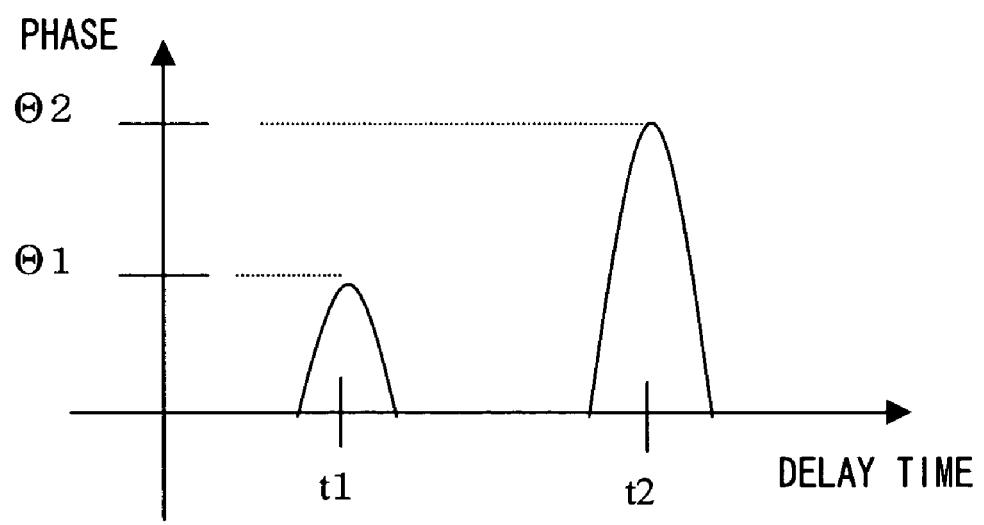
FIG. 16 shows the relationship between the phase difference obtained from the output of the detector and the delay time of the delay line.

FIG. 16 shows the relationship between the delay time by the programmable delay line 13 and the phase difference as in FIG. 15. The delay times t1 and t2 correspond to the phase differences θ1 and θ2 explained by referring to FIG. 14.

In this example, the process is performed by software using the microcomputer after digitizing the I and Q components output by the I-Q detector to obtain the distance to the target. However, it is obvious that the phase and distance can also be computed by an analog circuit. Since a signal of 10 MHz or lower is used by a low-pass filter as described above, a common LSI, etc. can be used.

Figure 17:
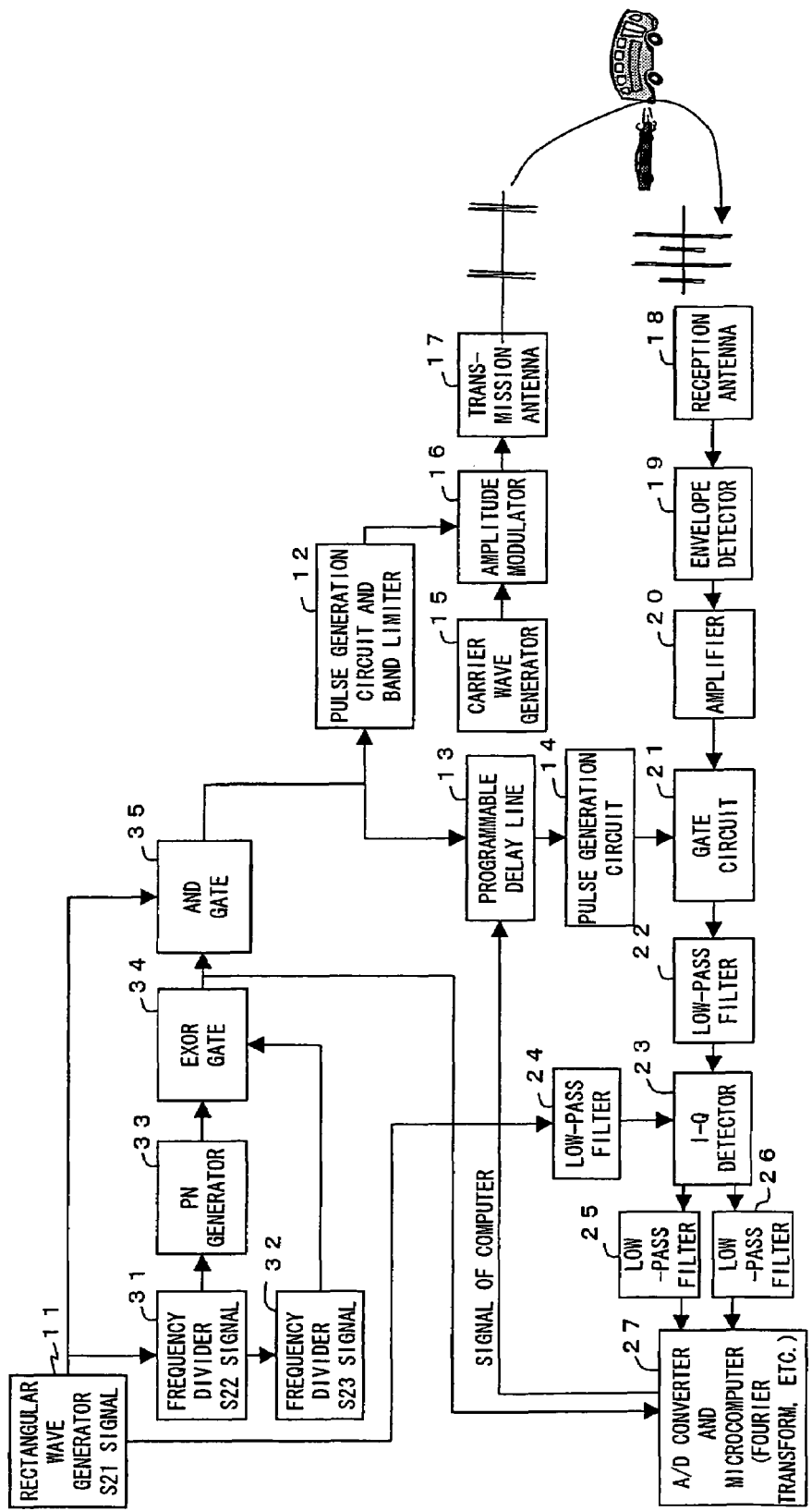
FIG. 17 is a block diagram of the configuration of the ASK-SS radar device according to the second embodiment of the present invention.

FIG. 17 is a block diagram of the configuration according to the second embodiment of the pulse radar apparatus of the present invention. In the second embodiment, to prevent a malfunction of detecting wrong targets by the interference of a plurality of radar units as described above, the spread spectrum (SS) system is applied, a signal is spread and transmitted using a pseudo-random sequence, and the counterspread is performed during reception, which is hereinafter referred to as an ASK-SS system.

That is, the feature shown in FIG. 17, as compared with FIG. 4, is that a spread result is supplied using a pseudo-random sequence instead of providing the output of the rectangular wave generator 11 for the pulse generation circuit and the band limiter 12, and the programmable delay line 13 as is as shown in FIG. 4.

In FIG. 17, the output (signal S21) of the rectangular wave generator 11 explained by referring to FIG. 5 is supplied to the frequency divider 31, and the frequency divider 31 outputs the signal S22 of the frequency corresponding to the chip section of the PN sequence. The signal is also supplied to another frequency divider 32, and a signal S23 of a lower frequency than the signal S22, for example, having the iteration of the PN sequence corresponding to the ½ period is output.

FIG. 18 shows an output of a PN (sequence) generator 33. The iteration period of the PN sequence corresponds to, for example, the bit section as described above, and can be, for example, ½ of the period of the signal S23.

Figure 19A:
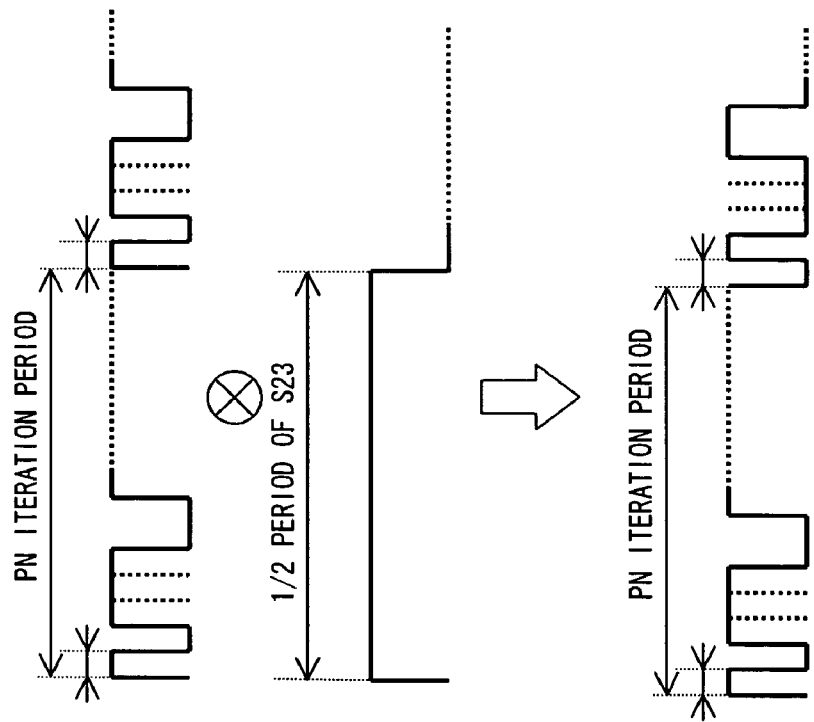
FIG. 19A shows a waveform of a time area of an output of an EXOR gate.
Figure 19B:
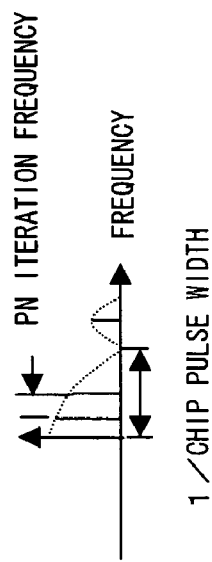
FIG. 19B shows a waveform of a frequency area of an output of an EXOR gate.

Then, an EXOR gate 34 obtains an exclusive logical sum (EXOR) between the output of the PN (sequence) generator 33 and the signal S23 as the output of the frequency divider 32. The output can be the waveform of the PN sequence in the section when the signal S23 is H as shown in FIG. 19A, and the PN sequence is inverted and output in the section when the signal S23 is L.

The output of the EXOR gate 34 corresponds to the result of the phase modulation by the signal S23 of the PN sequence. The PN sequence is used to prevent the interference of a number of radar units on a car radar as described above, and the phase modulation has a further effect to suppress the interference.

Finally, an AND gate 35 obtains a logical product between the output of the EXOR gate 34 and the signal S21 output by the rectangular wave generator 11, and the output is supplied to the pulse generation circuit and the band limiter 12, and the programmable delay line 13 as in FIG. 4.

FIGS. 20A and 20B show the output of the AND gate 35. FIG. 20A shows the waveform of a time area. In the upper waveform, for example, during the first H section corresponding to one chip section, the pulse of the signal S21 (10 MHz) as the output of the rectangular wave generator 11 is repeated a number of times. Since the upper waveform cannot correctly represent it, the lower enlarged waveform is presented as the output of the pulse generation circuit and the band limiter 12.

FIG. 20B shows the waveform in the frequency area, and the frequency component includes a number of components around the frequency of the signal S21.

In the second embodiment shown in FIG. 17, a transmission pulse is transmitted based on the output of the AND gate 35, and the reception pulse is detected by the I-Q detector 23 through the gate circuit 21, etc. and is output from the low-pass filters 25 and 26 as in the first embodiment shown in FIG. 4. However, since the transmission signal is spread using the pseudo-random sequence, the counterspreading operation, etc. is required, and different processes are performed by the A/D converter and the microcomputer 27, especially by the microcomputer, in the present embodiment.

The different points are described below. That is, the output of the EXOR gate 34 is supplied to the microcomputer for counterspread, the counterspreading process is performed, the above-mentioned value of ($I^2+Q^2$) is obtained and then a Fourier transform is performed, the power in only the frequency area of the signal S23 is extracted, and the distance is obtained using the point when the value indicates the maximum value defined as the turnaround of the electric wave.

In the above-mentioned second method, the I and Q signals after the counterspread are similarly treated by the Fourier transform, the power in only the frequency area of the signal S23 is extracted, and using it as the values of I and Q, the phase difference and the distance to the target are obtained by the above-mentioned equations (2) through (4).

Figure 21:
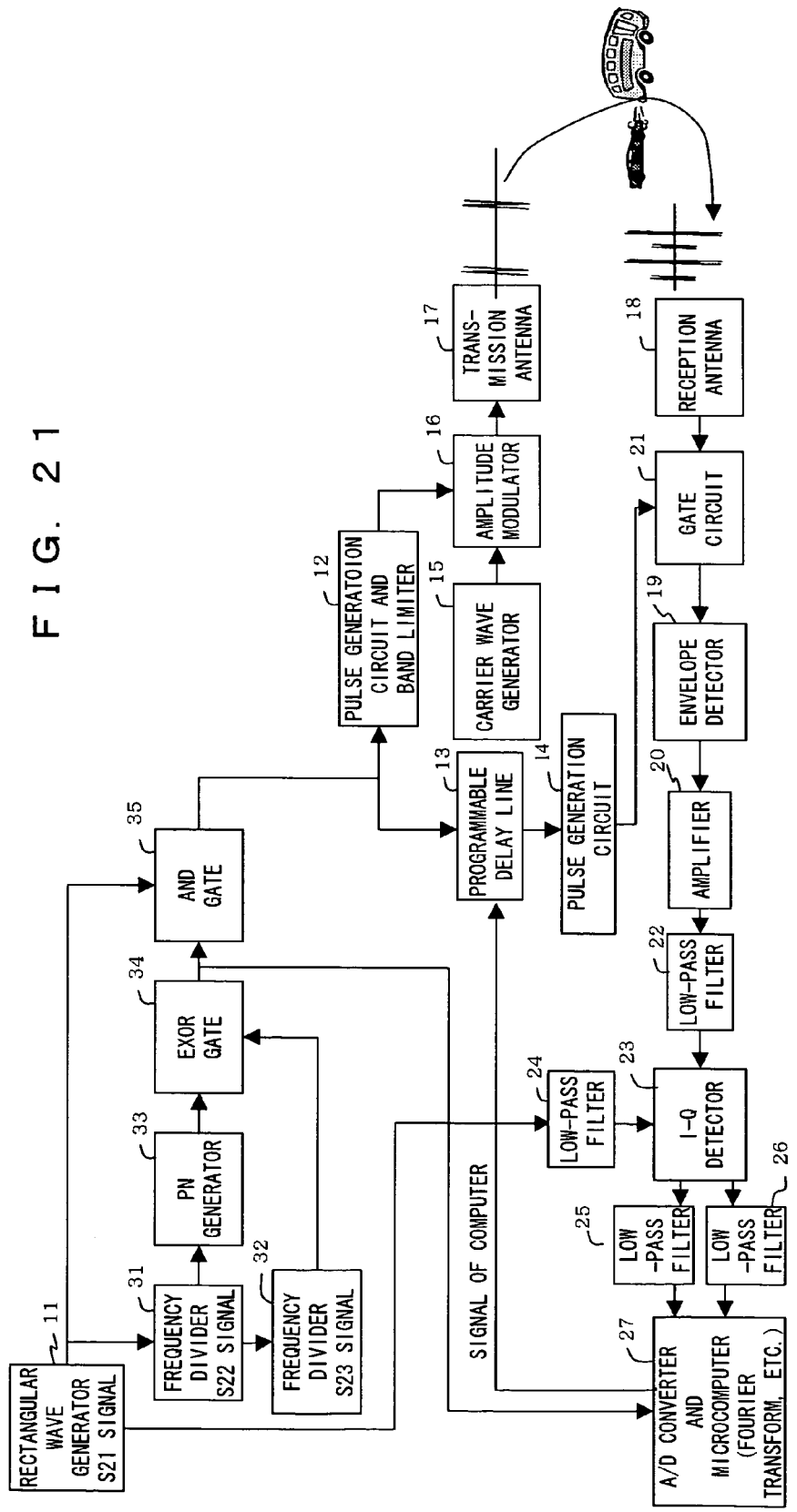
FIG. 21 is a block diagram of the configuration according to the third embodiment of the pulse radar apparatus of the present invention.

FIG. 21 is a block diagram of the configuration according to the third embodiment of the pulse radar apparatus of the present invention. In the third embodiment, as in the second embodiment, an operation to which the spread spectrum system is applied is performed. However, the feature of the third embodiment is that the gate circuit 21 arranged in the stage subsequent to the amplifier 20 shown in FIG. 17 is provided between the reception antenna 18 and the envelope detector 19.

With the above-mentioned configuration, although there occurs leakage to the pulse signal for control of a gate operation, it can be separated from a high-frequency signal by a high-pass filter, thereby cutting off the leakage element and preventing a malfunction.

Figure 22:
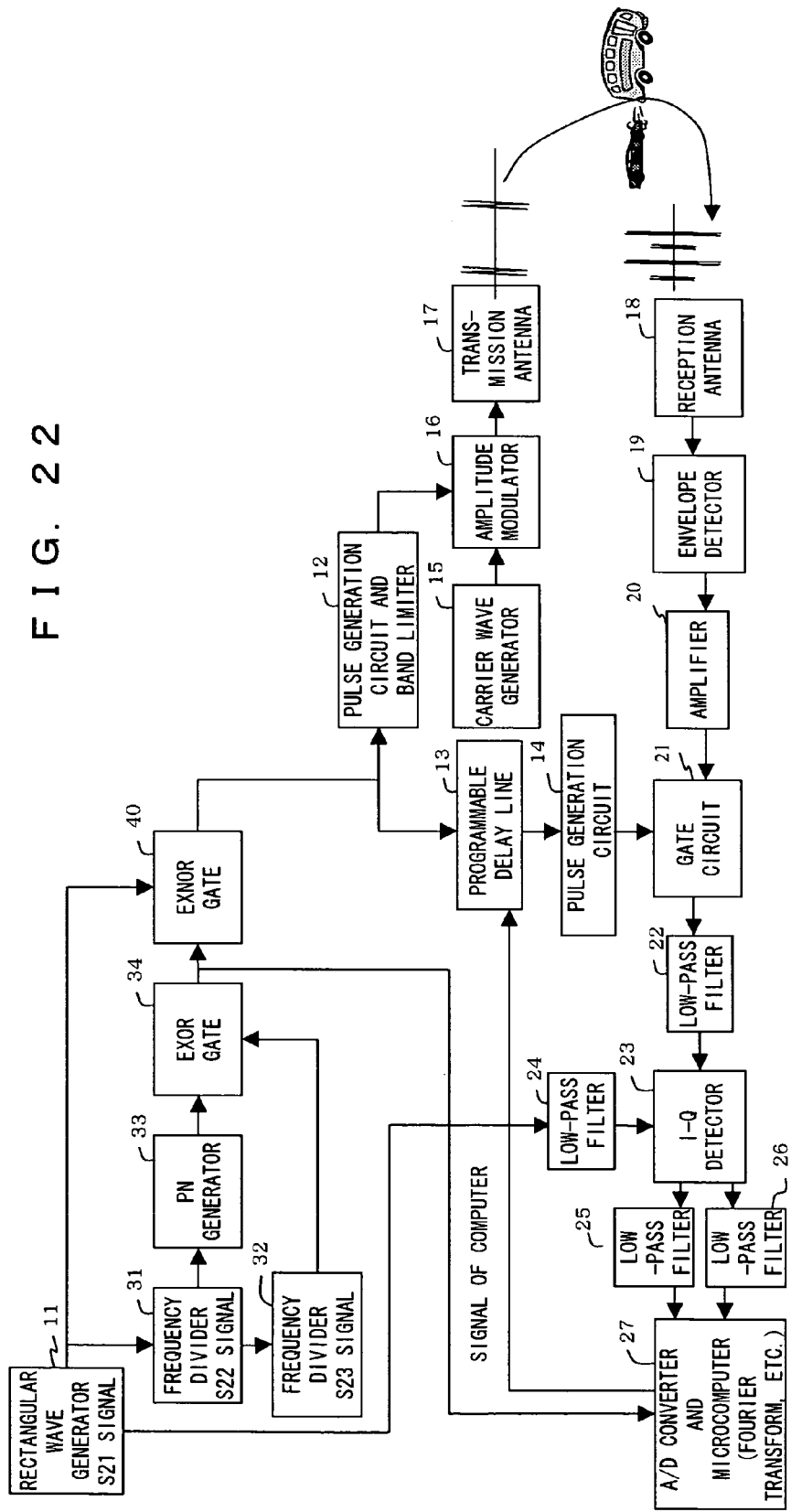
FIG. 22 is a block diagram of the configuration of an improved ASK-SS radar device according to the fourth embodiment the present invention.

FIG. 22 is a block diagram of the configuration according to the fourth embodiment of the pulse radar apparatus of the present invention. Also in the fourth embodiment, as in the second and third embodiments, an operation to which the spread spectrum system is applied is performed, but the feature of the present embodiment is that an EXNOR gate 40 shown in FIG. 22 replaces the AND gate 35 in the second embodiment as shown in FIG. 17. The fourth embodiment is referred to as an improved ASK-SS system.

In the second embodiment, as explained above by referring to FIGS. 20A and 20B, no pulses are present in the output of the pulse generation circuit and the band limiter 12 in the section when the pseudo-random sequence is L, there is a section in which no signals are transmitted from the transmission antenna 17, and the amplitude of a received signal is reduced correspondingly. Then, in the fourth embodiment, the section in which no pulses are output is reduced using the EXNOR gate 40, and the signal processing is assured by doubling the amplitude of the signal when it is received as described later.

Figure 23:
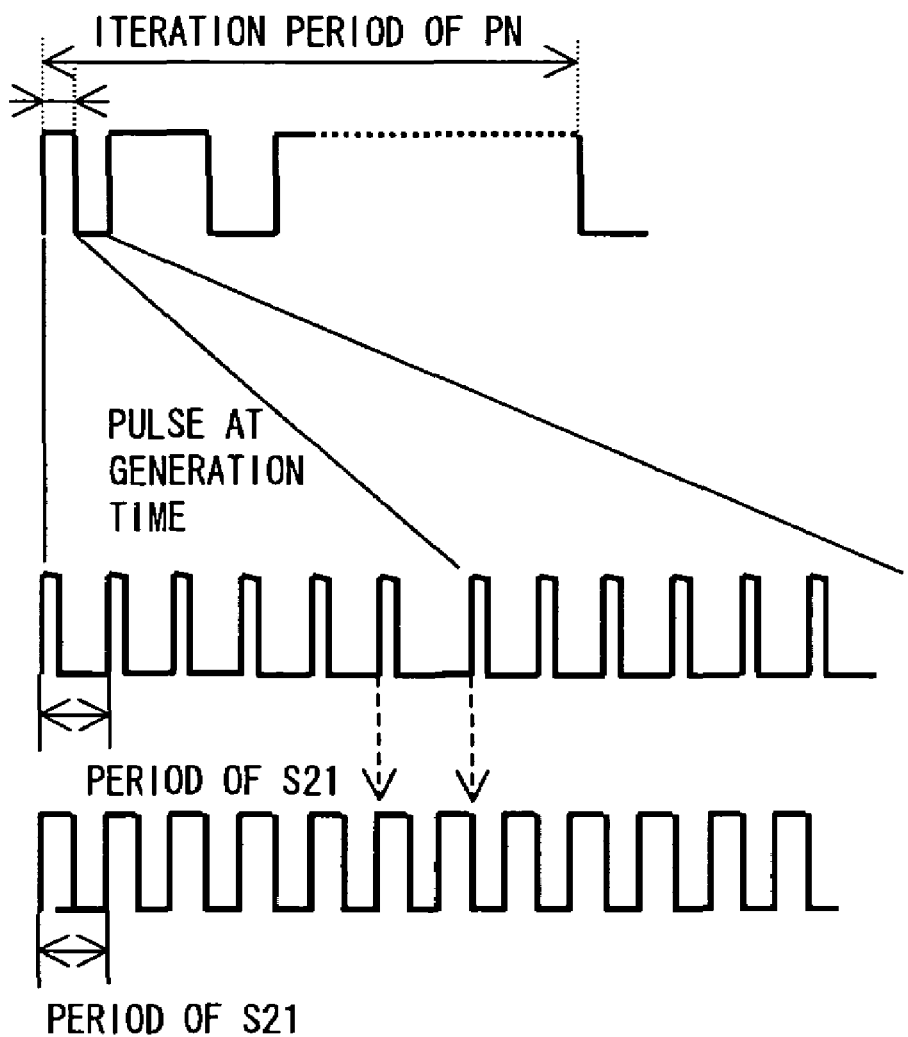
FIG. 23 shows a pulse generated according to the fourth embodiment of the present invention.

FIG. 23 is an explanatory view of an output signal of the EXNOR gate 40 shown in FIG. 22. FIG. 23 corresponds to FIG. 20 showing the second embodiment. In FIG. 20, a pulse is generated only in the section in which the PN sequence is H. In FIG. 23, a pulse which rises at the falling point of an AM-OSC rectangular wave signal, that is, the signal S21, is generated in the section in which the PN sequence is L.

This indicates the pulse is generated only in the section in which the signal S21 is H because the AND gate 35 is used in FIG. 17, that is, amplitude-modulate is performed while, in FIG. 22, the phase is 180° shifted by means of the EXNOR gate, and a pulse is generated in synchronization with the fall of the signal S21, that is, the phase modulation is performed.

Figure 24:
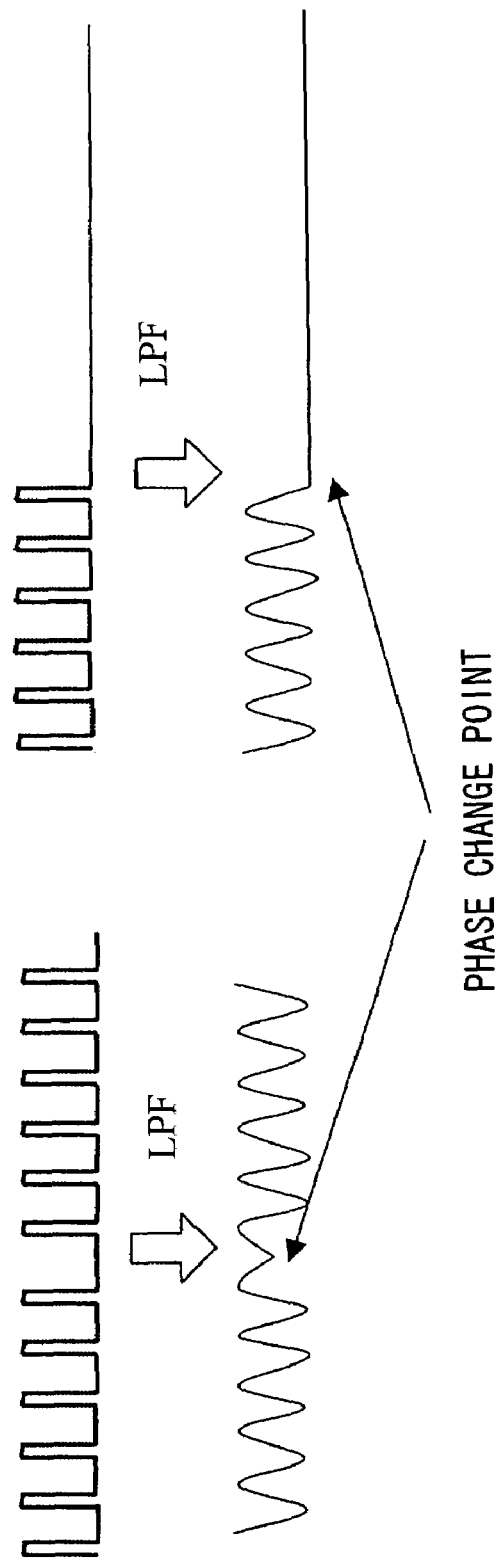
FIG. 24 shows the comparison of the output between the gate circuit and the subsequent low-pass filter according to the second embodiment of the present invention.

The difference between the operation on a received signal in the fourth embodiment and the operation in the second embodiment is explained below by referring to FIGS. 24 through 26. FIG. 24 is an explanatory view showing the concept of an output of the low-pass filter 22, showing the output in the fourth embodiment on the left, and the output in the second embodiment on the right.

Assuming that a received signal, that is, an output of the gate circuit 21 is similar in waveform to a generated pulse described by referring to FIGS. 20A, 20B, and 23, an output frequency of the rectangular wave generator 11, for example, a waveform of a sine wave of 10 MHz, is output from the low-pass filter 22 in the fourth embodiment in the section in which the PN sequence is L. Although the phase suddenly changes at the point where the PN sequence changes from H to L, a sine wave of the same frequency is output in the section in which the PN sequence is L.

On the other hand, in the second embodiment shown on the right in FIG. 24, no sine wave is output in the section in which the PN sequence is L, and the output of the low-pass filter 22 is 0.

Figure 25:
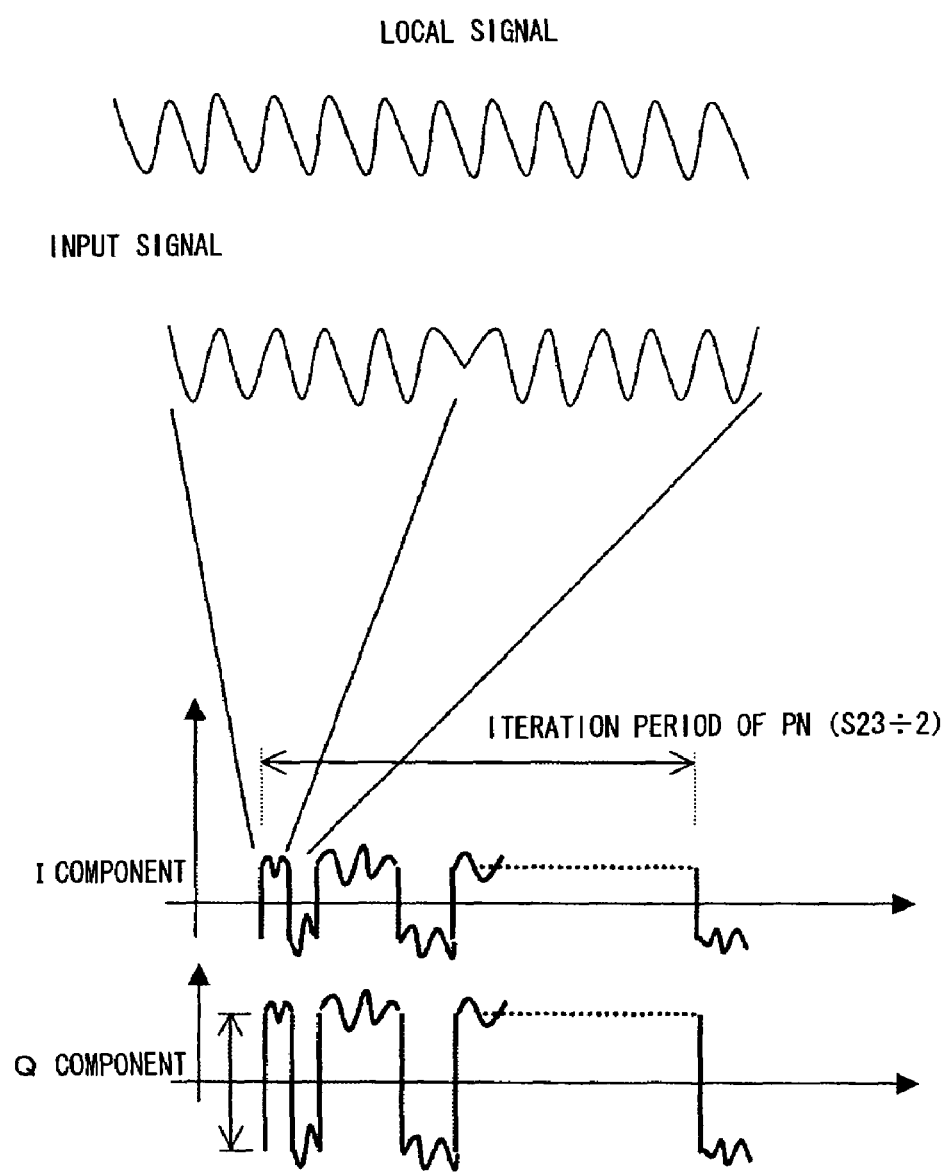
FIG. 25 shows an output of the I-Q detector according to the fourth embodiment of the present invention.

FIGS. 25 and 26 respectively show the output operations of the I-Q detector 23 in the fourth embodiment and the second embodiment. In the I-Q detection, the detecting process is performed using a local signal as a sine wave having the same frequency as the input signal.

In FIG. 25, positive values of I and Q components are output in the section in which the PN sequence is H, and the phase of the input signal from the low-pass filter 22 is substantially inverted in the section in which the PN sequence is L. Therefore, negative values of I and Q components are output.

On the other hand, in the second embodiment shown in FIG. 26, the value of the input signal is 0 in the section in which the PN sequence is L. Therefore, the values of the I and Q components are 0.

As described above, in the fourth embodiment, the amplitude of the output signal of the I-Q detector can be doubled as compared with the second embodiment, and the section in which the amplitude is 0 can be reduced. Thus, for example, the signal processing by the A/D converter and the microcomputer 27 can be assured.

That is, in the second embodiment, it is necessary to select data only in the section in which the PN sequence is H. However, for example, when the signal processing is performed at a higher speed, it is troublesome to check the H or L sections with a time delay taken into account. Additionally, since the values of signals have no positive or negative sections, it is not possible to detect a direct offset current. On the other hand, in the fourth embodiment, for example, an average value can be obtained to cancel the direct offset current, and can use the entire section as data.

As described above, according to the present invention, for example, a basic signal in generating a transmission pulse can be delayed and a gate operation can be performed on a received signal, thereby realizing a radar device capable of carrying out a correct distance measurement. Furthermore, as a merit of an AM, a noise band can be restricted by the cutoff using a narrow band filter, and a malfunction of detecting wrong targets by the interference of other radar units can be suppressed by the spread spectrum system.

What is claimed is:

1. A pulse radar apparatus which detects a target by transmitting a pulse signal, comprising:
a pulse generation unit generating a basic signal to generate a transmitting pulse signal;
a delay unit delaying the basic signal to generate a control pulse signal; and
a gate unit performing a gate operation in which a received signal is passed when the control pulse signal is in a first logical state and the received signal is not passed when the control pulse is in a second logical state.

2. The apparatus according to claim 1, further comprising:
a detection unit detecting an output of said gate unit; and
a distance computation unit computing a distance to a target as associated with a delay amount which shows a maximum value of a component corresponding to amplitude of a received signal using an output of said detection unit when said control pulse generation unit changes the delay amount.

3. The apparatus according to claim 1, further comprising:
a detection unit detecting an output of said gate unit; and
a distance computation unit computing a distance to a target as associated with a phase difference between the basic signal and the received signal using an output of said detection unit when said control pulse generation unit changes the delay amount.

4. The apparatus according to claim 1, further comprising:
a modulation signal generation unit generating a pulse from the basic signal in generating a transmission pulse, and generating a modulation signal for generation of a transmission pulse with a band limit of the spectrum range of the pulse.

5. A pulse radar apparatus which detects a target by transmitting a pulse signal, comprising:
a control pulse generation unit generating a control pulse signal by delaying a signal generated using a first signal which is a basic signal in generating a transmission pulse, a second signal for phase modulation of a frequency lower than the first signal, and a pseudo-random signal for amplitude modulation generated at an intermediate frequency between the first and second signals; and
a gate unit functioning as a gate for a received signal using the control pulse signal.

6. The apparatus according to claim 5, wherein said pseudo-random signal is an amplitude modulation signal for the first signal.

7. The apparatus according to claim 5, wherein said pseudo-random signal is a phase modulation signal for the first signal, and said generated signal is a signal in which a pulse exists in a section in which the pseudo-random signal is low.

8. The apparatus according to claim 5, further comprising:
a detection unit detecting an output of said gate unit; and
a distance computation unit performing counterspread using the pseudo-random signal on an output of said detection unit, extracting power of a frequency area, and computing a distance to a target as associated with a delay amount indicating a maximum value of the power, when said control pulse generation unit changes the delay amount.

9. The apparatus according to claim 5, further comprising:
a detection unit detecting an output of said gate unit; and
a distance computation unit performing counterspread using the pseudo-random signal on an output of said detection unit, extracting power of a frequency area, and computing a distance to a target as associated with a phase difference between the first basic signal and a received signal, when said control pulse generation unit changes the delay amount.

10. The apparatus according to claim 5, further comprising:
a modulation signal generation unit generating a pulse from a signal generated using the first signal, the second signal, and the pseudo-random signal, and generating a modulation signal for generation of a transmission pulse with a band limit of a spectrum range of the pulse.

11. A pulse radar apparatus which detects a target by transmitting a pulse signal, comprising:
pulse generation means for generating a basic signal to generate a transmitting pulse signal;
delay means for delaying the basic signal to generate a control pulse signal; and
gate means for performing a gate operation in which a received signal is passed when the control pulse signal is in a first logical state and the received signal is not passed when the control pulse is in a second logical state.

12. A pulse radar apparatus which detects a target by transmitting a pulse signal, comprising:
control pulse generation means for generating a control pulse signal by delaying a signal generated using a first signal which is a basic signal in generating a transmission pulse, a second signal for phase modulation of a frequency lower than the first signal, and a pseudo-random signal for amplitude modulation generated at an intermediate frequency between the first and second signals; and
gate means for functioning as a gate for a received signal using the control pulse signal.

* * * * *